United States Patent [19]

Nakayama

[11] Patent Number: 4,607,717
[45] Date of Patent: Aug. 26, 1986

[54] STEERING APPARATUS

[75] Inventor: Masafumi Nakayama, Yamato, Japan

[73] Assignee: Nissan Motor Company, Limited, Japan

[21] Appl. No.: 694,975

[22] Filed: Jan. 25, 1985

[30] Foreign Application Priority Data

Jan. 27, 1984 [JP] Japan ................................ 59-13885

[51] Int. Cl.$^4$ .......................... B62D 3/12; B62D 5/10; F15B 9/10
[52] U.S. Cl. ................................. 180/141; 74/388 PS; 91/368; 91/375 A; 92/136; 180/148; 180/159
[58] Field of Search ............... 180/141, 143, 132, 146, 180/147, 148, 149, 151, 152, 153, 154, 159, 160, 161, 162; 74/388 PS; 91/375 A, 368, 374; 92/136

[56] References Cited

U.S. PATENT DOCUMENTS

| 4,119,172 | 10/1978 | Yanagishima et al. | 180/141 |
| 4,195,706 | 4/1980 | Konishi | 91/375 A X |
| 4,279,323 | 7/1981 | Ando et al. | 180/148 |
| 4,299,302 | 11/1981 | Nishikawa et al. | 180/148 |
| 4,401,180 | 8/1983 | Nishikawa et al. | 180/148 |

FOREIGN PATENT DOCUMENTS 56-136855 10/1981 Japan .
1379606 1/1975 United Kingdom ............... 180/141

Primary Examiner—John J. Love
Assistant Examiner—Mitchell J. Hill
Attorney, Agent, or Firm—Schwartz, Jeffery, Schwaab, Mack, Blumenthal & Evans

[57] ABSTRACT

A steering apparatus, which includes a device for fluid power-assist of manual steering forces transmitted to a steering gear, a control valve controlling operation of the fluid power-assist device, a valve body of the valve being actuated in accordance with a signal indicative of steering conditions and a steering reactive-force transmitting member directly transmitting steering reactive forces to the valve body so as to displacing same in response to an abnormal steering reactive force. The steering reactive-force transmitting member corrects an abnormal position of the valve body by engaging and moving the valve body when the reactive force exceeds a predetermined magnitude.

17 Claims, 2 Drawing Figures

STEERING APPARATUS

BACKGROUND OF THE INVENTION

1. Field of the Invention

This invention relates to an automotive vehicle steering apparatus and more particularly to an apparatus employing a hydraulic actuator for steerable road wheels.

2. Description of the Prior Art

Japanese published unexamined utility model application No. 56-136855 discloses the automotive vehicle steering apparatus shown in FIG. 1. This steering apparatus comprises an oil pump 1 driven by an engine, a reservoir 2, a control valve 3, a power cylinder 4 for actuating steerable road wheels, an electrical contact unit 5 for the control valve 3, and connecting hydraulic lines. The control valve 3 includes a spool-type valve body 3a and two solenoids 3b electrically connected to the control unit 5. The control unit 5 receives electrical signals T, $\omega$, $\dot{\omega}$ and V and provides the solenoids 3b with controlled electrical currents in response thereto. The signal T represents a manual steering force applied to a steering wheel, not shown. The signal $\omega$ represents the angular deviation of the steering wheel from its normal position. The signal $\dot{\omega}$ represents the angular velocity of the steering wheel. The signal V represents a vehicle speed.

This automotive vehicle steering apparatus has a problem in that, since the steerable road wheels are simply hydraulically controlled through the control valve 3, the automotive vehicle cannot be adequately steered if the control unit 5 and/or any of sensors outputting the electrical signals T, $\omega$, $\dot{\omega}$ and V malfunction.

SUMMARY OF THE INVENTION

An object of this invention is to provide a hydraulic power-assisted steering apparatus capable of performing a fail-safe operation. In order to achieve this object, the steering apparatus of this invention includes a device for hydraulic power-boosting a manual steering force transmitted to a steering gear; a control valve controlling operation of the hydraulic power-assist device, a valve body of the valve being actuated in accordance with a signal indicative of steering conditions of a steering wheel; and a steering reactive-force transmitting member directly transmitting a steering reactive force to the valve body so as to displace same in response to an abnormal steering reactive force. The steering reactive-force transmitting member corrects the position of the valve body by means of engaging and displacing the valve body when its own displacement from its normal position exceeds a predetermined quantity.

According to this invention, normal power-assisted steering can be ensured if any of various sensors outputting signals indicative of steering conditions or a signal generator controlling a control valve should malfunction.

DESCRIPTION OF THE PREFERRED EMBODIMENTS

Figure 1:
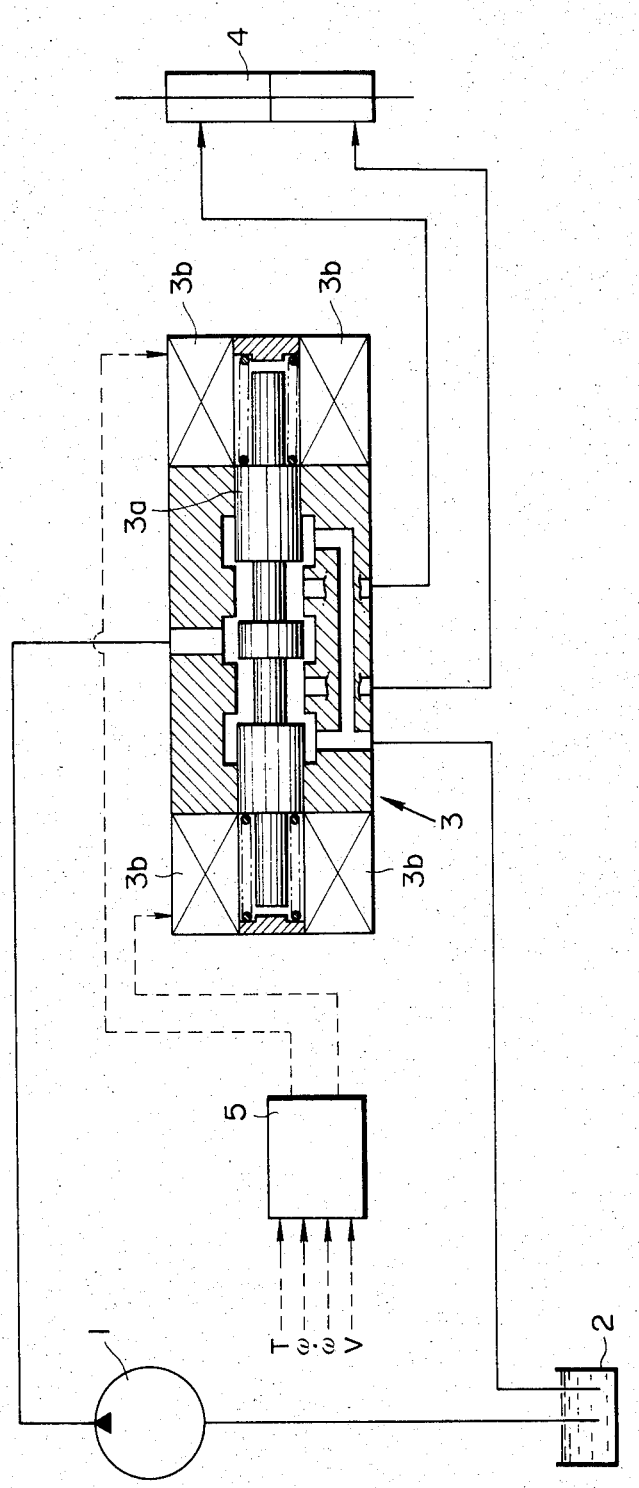
FIG. 1 is a diagram of a prior art automotive vehicle steering apparatus.

An embodiment of this invention will be described in detail with reference to FIG. 2. In summary, an automotive steering apparatus employing the present invention comprises a steering gear assembly 15, a control valve assembly 24 and various hydraulic pressure supply and control elements discussed later. The steering gear 15 serves to transmit movement of a steering wheel 10 to steerable road wheels 32, 35 via a rack-and-pinion arrangement. The control valve 24 cooperates with the steering gear 15 to facilitate steering by reducing the manual force required to achieve a given steering adjustment.

A pinion shaft 11 connects the steering wheel to both the steering gear 15 and the control valve 24. A threaded upper end 11a of the pinion shaft 11 is mechanically connected to a steering wheel 10. The pinion shaft 11 rotates rigidly with the steering wheel and transmits a steering reactive force to it. The pinion shaft 11 can be subdivided into the upper end 11a, a first journalled section 11b, a pinion 11c, a second journalled section 11d and valve body spool engagement section 11e.

The first journalled section 11b extends through an opening 14a in an upper cover 14 for the steering gear 15 and is supported by a rotary bearing 12. A bearing cup 13 fits over the bearing 12 and is received within the upper cover 14. The upper cover 14 is fixed to a gear housing 26 which is in turn fixed to a vehicle frame, not shown. The bearing cup 13 is centered about pinion shaft 11 by centering springs 16. The bearing cup 13 can shift laterally within a clearance Y between the outer cylindrical surface of the bearing cup 13 and the inner cylindrical surface of the upper cover 14. The pinion 11c passes through upper and lower openings 25 in the gear housing 26 and meshes with a rack 17. The second journalled section 11d is supported by a rotary bearing 18 retained by a sleeve 19 which is installed within a slot 20a extending parallel to the axis of the rack 17 with a valve casing 20 of the control valve 24. The sleeve 19 is centered over the pinion shaft 11 by centering springs 21 and is free to move within a clearance X between the sleeve 19 and the walls of the slot 20a. Since the clearance Y, as shown in FIG. 2, is smaller than the clearance X, the transverse displacement of the pinion shaft 11 relative to the gear housing 26 is actually limited to within the clearance Y. The clearance X is substantially equal to the maximum displacement of a valve body or spool 23 of the control valve 24 from its normal position. The spool engagement section 11e passes through a slot 22 in one end of the spool 23 and is free to move within a clearance H or H' between the spool engagement section 11e and inner walls of the slot 22. The clearances X and H' are larger than the clearanaces H and H'.

The rack 17 moves perpendicular to the axis of the pinion shaft 11. The opposite ends of the rack 17 have rods 27 and 28, the rod 27 being connected to a piston 29 of a hydraulic power cylinder 30 and the rod 28 being connected to a drive link 31 for a steerable right-hand road wheel 32. The piston 29 has a rod 33 connected to a drive link 34 for a steerable left-hand road wheel 35, the rod 33 being opposite the rod 27.

The power cylinder 30 is situated at the left-hand side of the bearing housing 26 and is integral with the bearing housing 26. The power cylinder or double-acting cylinder 30 has inner and outer chambers 36 and 37.

The valve casing 20 of the control valve 24 is fixed to the gear housing 26. The valve casing 20 includes a bore 38 which comprises a main control chamber 39, a first pilot chamber 40 and a second pilot chamber 41. The walls of the main control chamber 39 have three annular grooves 42, 43 and 44 and two annular lands 45 and 46. The grooves 42, 43 and 44 are of equal depth and the lands 45 and 46 are of equal inner diameter. The left-hand groove 42 is as wide as the right-hand groove 44. The central groove 43 is twice as wide as the left-hand groove 42. The left-hand land 45 is as wide as the right-hand land 46. The left-hand land 45 is situated between the grooves 42 and 43 and the right-hand land 46 is situated between the grooves 43 and 44. The walls of the central groove 43 are provided with a supply port 47 hydraulically connected to oil pump 48. The walls of the left-hand groove 42 are breeched by a first return port 49 leading to an oil reservoir 50. The wall of the right-hand groove 44 are provided with a second return port 51 connected to the oil reservoir 50. The walls of the left-hand land 45 are provided with a first output port 52 hydraulically connected to the inner chamber 36 of the power cylinder 30. The walls of the right-hand land 46 are provided with a second output port 53 hydraulically connected to the outer chamber 37 of the power cylinder 30. The annular walls of the first pilot chamber 40 are provided with a first pilot pressure port 54 which is hydraulically connected to a first output port 55 of a pilot pressure generator 56. The annular walls of the second pilot chamber 41 are provided with a second pilot pressure port 57 which is hydraulically connected to a second output port 58 of the pilot pressure generator 56.

Figure 2:
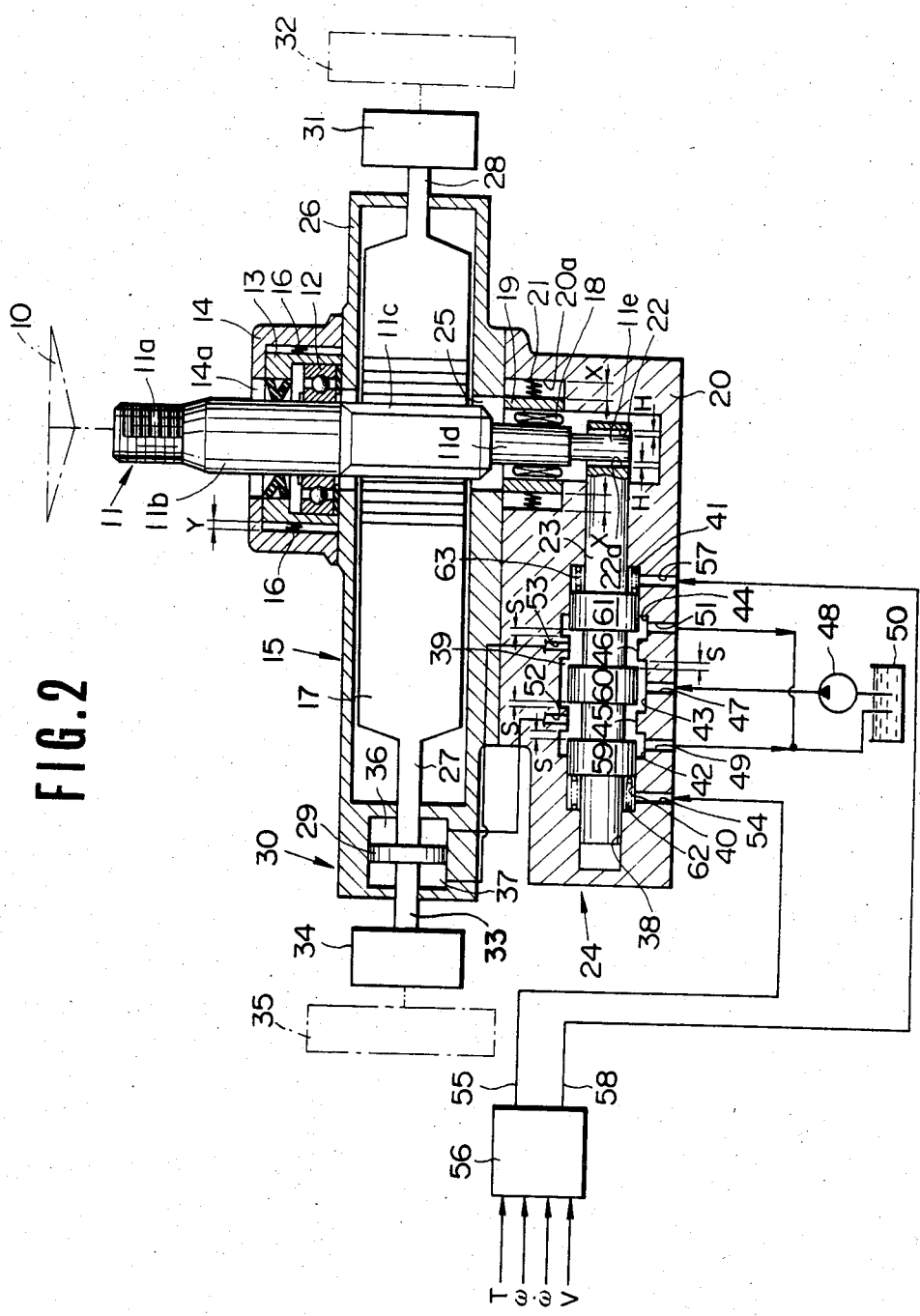
FIG. 2 is a diagram including a sectional view of an automotive vehicle steering apparatus of this invention.

The spool 23 is urged towards its normal position by centering springs 62 and 63 as shown in FIG. 2, but is free to move parallel to the axis of the rack 17. The spool 23 has three lands 59, 60 and 61 spaced at equal intervals. The lands 59, 60 and 61 are of equal width and equal diameter matching the inner diameter of the two lands 45 and 46 of the valve casing 20. The left-hand land 59 cooperates with the left-hand land 45 of the valve casing 20 to form a variable orifice which controls the rate of flow through the first return port 49. The central land 60 cooperates with the lands 45 and 46 of the valve casing 20 to form two variable orifices, one controlling the flow through the first output port 52 and the other controlling the flow through the second output port 53. The right-hand land 61 cooperates with the right-hand land 46 of the valve casing 20 to form a variable orifice which controls the flow through the second return port 51. The spool stroke S (i.e. the stroke of the valve body) between its normal position (FIG. 2) and either a left-hand position in which the respective lands 59 and 60 of the spool 23 coincide with the left-hand edges of the corresponding lands 45 and 46 of the valve casing 20 or a right-hand position in which the respective lands 60 and 61 coincide with right-hand edges of the corresponding lands 45 and 46 is between the clearances H and H' and the clearance X and H' in length.

The pilot pressure generator 56 receives electrical signals T, $\omega$, $\dot{\omega}$ and V and serves in the place of the control unit 5 of FIG. 1. The pilot pressure generator 56 may receive other signals indicating steering conditions effected by the steering wheel and/or travelling conditions of an automotive vehicle from various sensors, not shown.

The operation of this invention will be described with reference to FIG. 2.

When the sensors outputting the signals T, $\omega$, $\dot{\omega}$ and V and the pilot pressure generator 56 are operating normally, the pilot pressure generator 56 derives a desired steering magnitude of the steerable road wheels 32 and 35 in response to the signals T, $\omega$, $\dot{\omega}$ and V and applies suitable pilot pressures to the first pilot pressure port 54 and the second pilot pressure port 57 in accordance with the steering quantity as the driver manually rotates the steering wheel 10. Thus, as the driver manually rotates the pinion shaft 11 so as to move the rack 17 to the right or left, the spool 23 shifts conversely to the left or right in accordance with the differential between the two pilot pressures and so controls the flow through the first and second output ports 52 and 53. The power cylinder 30 provides a normal boost to the manual steering force of the driver in the desired direction. Accordingly, the pinion shaft 11 will receive transverse forces only from the spool 23. The clearances H and H' ensure a displacement of the pinion shaft 11 or spool engagement section 11e in the absence of a steering reactive force being transmitted to the spool 23 when control signals from the pilot pressure generator 56 normally operate.

If any of the sensors outputting the signals T, $\omega$, $\dot{\omega}$ and V and/or the pilot pressure generator 56 should malfunction such that the power cylinder 30 adversely urges the rack 17 against the desired steering direction, e.g., when the rack 17 receives a manual steering force which tends to urge it rightward by way of the pinion 11c of the pinion shaft 11 but the power cylinder 30 thrusts the rack 17 leftward due to an improperly higher oil pressure in the inner chamber 36, the pinion shaft 11 is subjected to an abnormal steering reactive force and shifts to the left together with the rack 17. The spool 23, which was first shifted through the clearance H' rightward from its normal position so that the higher oil pressure developed in the inner chamber 36, is thus immediately driven by the spool engagement portion 11e, now in contact with the inner walls 22a of the slot 22, to the left together with rack 17 and pinion 11, thereby correcting the position of the spool 23. Thus, the control valve 24 relieves the higher oil pressure in the inner chamber 36 so that the power cylinder 30 can once again normally assist manual steering by the driver. Since the clearance H and H' are smaller than the spool stroke S, the spool 23 cannot completely cover either of the first and second output ports 52 and 53 when any of the sensors for the signals T, $\omega$, $\dot{\omega}$ and V and/or the pilot pressure generator 56 malfunction, so that excessively abnormal pressure will not be applied to either of the chambers 36 or 37. Thus, the steering wheel will never be subjected to an abnormally high resistance. The steering apparatus of this invention can perform this fail-safe function regardless of which of the sensors for the signals T, $\omega$, $\dot{\omega}$ and V and/or the pilot pressure generator 56 malfunction.

The arrangement of the control valve 24 perpendicular to the pinion shaft 11 also obviates the effects of strong vertical vibrations of a travelling automotive vehicle, thus ensuring exact positioning of the spool 23.

This invention is also applicable to a ball-and-screw-type steering apparatus including a rotary flow control valve, for example.

What is claimed is:

1. A steering apparatus, comprising:

a pinion shaft having a pinion of a steering gear and operably connected with a steering wheel;

a rack of the steering gear operably connected to steerable road wheels and being in mesh with the pinion;

a power cylinder, having first and second hydraulic chambers opposing each other, for hydraulically actuating said rack;

a valve means for selectively connecting the first and second hydraulic chambers with a hydraulic pressure source and an oil reservoir, said valve means comprising a valve body which has an elongate slot in a direction of a movement of the valve body;

means, responsive to electric signals representative of steering conditions, for controlling a position of the valve body;

means, in response to a steering reactive force, for mechanically restraining the movement of the valve body, said restraining means comprising a rod in engagement with the elongate slot with a clearance along the direction of the movement of the valve body, the clearance allowing the controlling operation by said controlling means.

2. A steering apparatus as recited in claim 1, wherein said power cylinder comprises a double-acting power cylinder with a piston rod directly connected to said rack.

3. A steering apparatus as recited in claim 2, wherein the power cylinder is integral to a gear housing of said steering gear.

4. A steering apparatus as recited in claim 2, wherein said valve means has first and second output ports communicating with the opposing chambers of the power cylinder and a pressure fluid supply port capable of communicating with both the output ports at the same time and wherein stroke of the valve body from a normal position sufficient to block fluid communication between either of the output ports and the pressure fluid supply port is greater than said clearance when both the rod and the valve body are in their normal positions.

5. A steering apparatus as recited in claim 4, wherein the stroke of the valve body is smaller than the maximum displacement of the valve body from its normal position.

6. A steering apparatus as recited in claim 1, wherein a gear housing of the steering gear is fixed relative to a frame and the rack is movable with respect to the frame.

7. A steering apparatus as recited in claim 1, wherein a piston rod of said power cylinder is directly connected to said rack.

8. A steering apparatus as recited in claim 1, wherein said valve means comprises a spool as the valve body and a valve casing.

9. A steering apparatus as recited in claim 8, wherein the valve casing is fixed to a gear housing of said steering gear.

10. A steering apparatus as recited in claim 8, wherein the axis of the spool is parallel to that of said rack.

11. A steering apparatus as recited in claim 10, wherein said power cylinder comprises a double-acting power cylinder, a piston rod of which is directly connected to the rack and wherein said control valve means has first and second output ports communicating with the opposing chambers of the power cylinder and a pressure fluid supply port capable of communicating with both the output ports at the same time.

12. A steering apparatus as recited in claim 11, wherein said restraining means is said pinion shaft.

13. A steering apparatus as recited in claim 12, wherein said pinion shaft is supported by a bearing which is itself supported by the gear housing and movable along the axis of the rack.

14. A steering apparatus as recited in claim 13, wherein said pinion shaft is supported by another bearing which is itself supported by the valve casing and movable along the axis of the rack.

15. A steering apparatus as recited in claim 1, wherein said signal generator sends a pilot pressure signal for controlling the position of the valve body.

16. A steering apparatus for an automotive vehicle, comprising:

a steering gear including a rack-and-pinion mechanism, a pinion of which translates without rotating in response to a steering reactive force;

a hydraulic power cylinder for boosting manual steering forces transmitted to said steering gear;

a control valve for controlling operation of said power cylinder by means of a valve body which has an elongate slot in a direction of a movement of the valve body, the position of the valve body being determined by a control signal;

a signal generator for sending the control signal in accordance with steering conditions of the automotive vehicle to said control valve; and means, in response to the steering reactive force, for mechanically restraining the movement of the valve body, said restraining means having a rod in engagement with the elongate slot with a clearance along the direction of the movement of the valve body, the clearance allowing the controlling operation by said signal generator.

17. A steering apparatus as recited in claim 16, wherein said valve body comprises a spool and said signal generator sends a pilot pressure signal for controlling the position of the spool in accordance with the steering conditions.

* * * * *